United States Patent [19]
Phillips et al.

[11] 4,030,181
[45] June 21, 1977

[54] PIN FEEDING MECHANISM

[75] Inventors: Lawrence W. Phillips; Harris G. Rodgers, Sr., both of Corning, N.Y.

[73] Assignee: Corning Glass Works, Corning, N.Y.

[22] Filed: July 6, 1976

[21] Appl. No.: 702,697

[52] U.S. Cl. .................................. 29/809; 221/12; 221/169; 221/186; 221/287
[51] Int. Cl.² .......................................... B23Q 7/10
[58] Field of Search ............... 29/211 R, 208 R; 221/13, 10, 12, 169, 186, 167, 287

[56] References Cited
UNITED STATES PATENTS

| | | | |
|---|---|---|---|
| 1,588,594 | 6/1926 | Lawson et al. | 221/167 X |
| 3,018,020 | 1/1962 | Lancaster | 221/10 |
| 3,119,521 | 1/1964 | Taylor | 221/287 |
| 3,289,283 | 12/1966 | Muller | 29/211 R X |
| 3,882,998 | 5/1975 | Hunter | 221/167 X |

FOREIGN PATENTS OR APPLICATIONS 1,369,213  10/1974  United Kingdom ................ 221/13

*Primary Examiner*—Victor A. DiPalma
*Attorney, Agent, or Firm*—Charles W. Gregg; Burton R. Turner; Clarence R. Patty, Jr.

[57] ABSTRACT

A mechanism for automatically and sequentially feeding each of a plurality of pins, for supporting aperture masks adjacent the glass face plates or viewing panels of color television picture tubes, to a mechanism or gun for insertion of each of the pins into the glass of the face plates or viewing panels. The mechanism includes a rotatable turret or cylindrical pin magazine or canister which holds a relatively large quantity or plurality of the pins vertically stacked in columns adjacent the outer periphery of the turret or magazine for the pin feeding operations and which can readily and rapidly be removed from the mechanism and replaced by another full turret or pin magazine when the first one is empty of pins.

7 Claims, 10 Drawing Figures

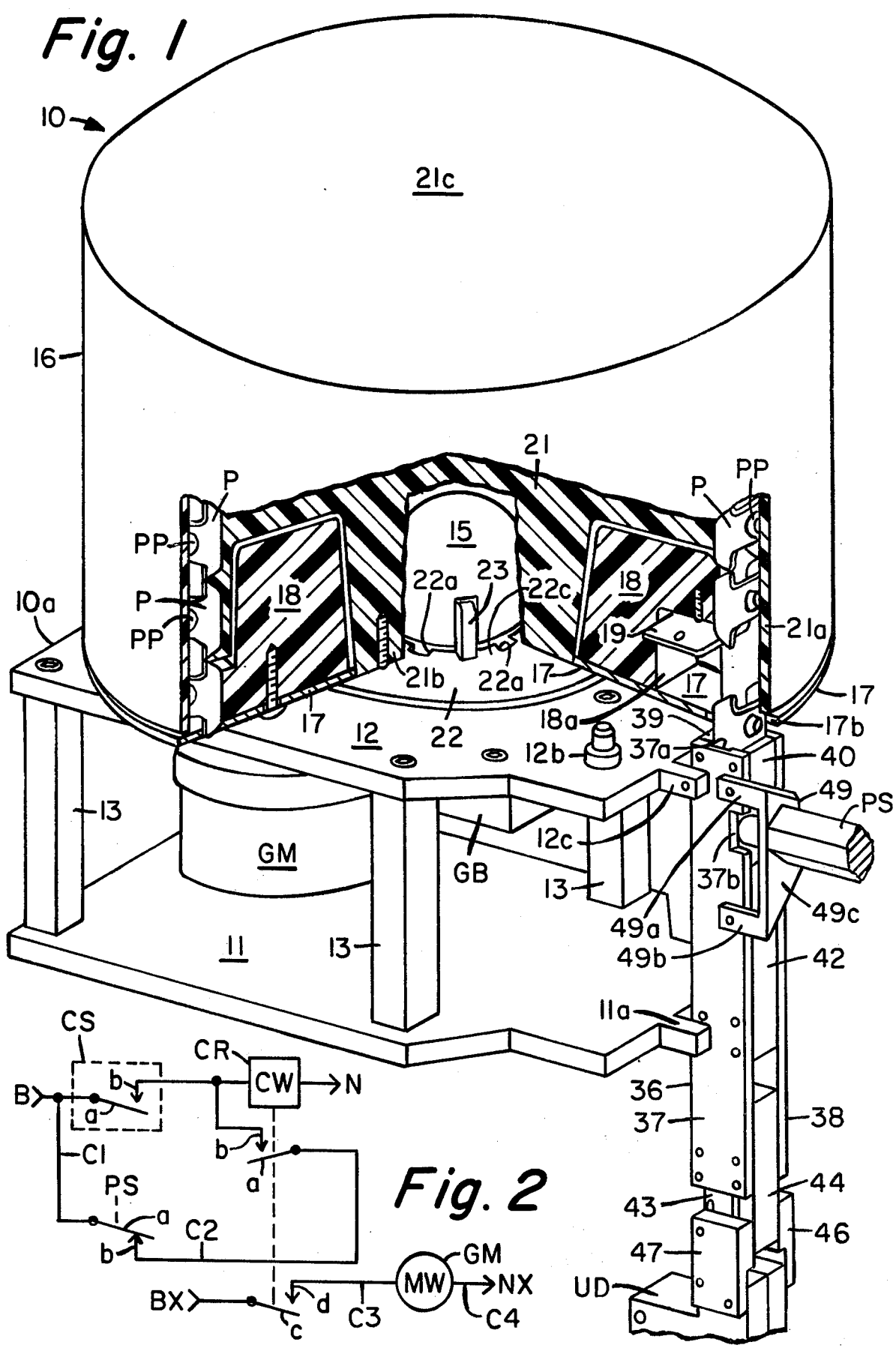

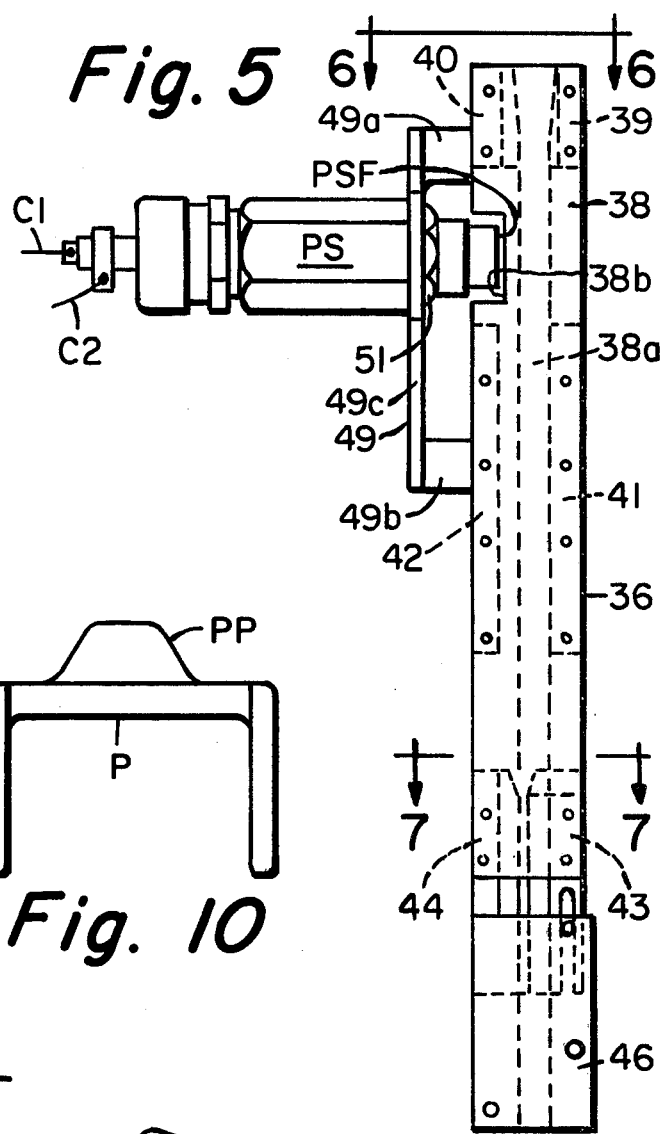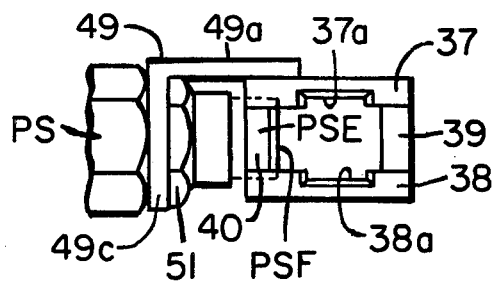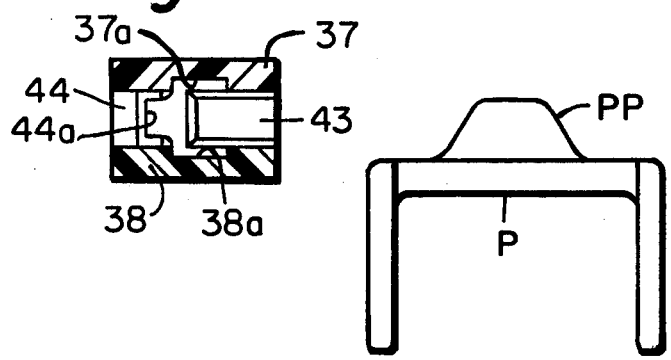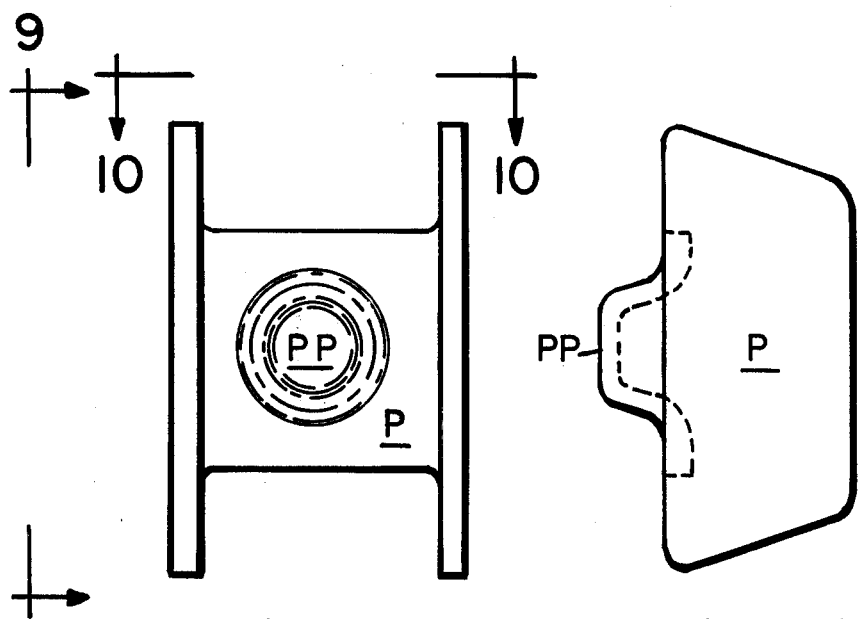

PIN FEEDING MECHANISM

BACKGROUND OF THE INVENTION

In operations performed in the manufacturing or fabricating of face plates or viewing panels for color television picture tubes, it is expedient for obvious economic or cost-reduction reasons, as in other manufacturing operations today, to automate, to the extent possible, the steps required in said tube face plate or viewing panel manufacturing or fabricating operations. For example, there is shown in copending U.S. patent application Ser. No. 580,331, filed May 23, 1975 by Harris G. Rodgers, Sr. and entitled "Color Television Picture Tube Envelope", a picture tube envelope including a generally rectangular curved glass face plate having embedded, in each of the corner regions of the concave surface thereof, an end of a channel shaped pin for supporting an aperture mask adjacent such concave surface. Such aperture mask support pins may, for example, be of the type disclosed in copending U.S. patent application Ser. No. 629,646, now U.S. Pat. No. 3,988,631 filed Nov. 6, 1975 by Harris G. Rodgers, Sr. and entitled "Pin For Supporting the Aperture Mask In a Color Television Picture Tube".

In order that the above mentioned face plate or viewing panel manufacturing or fabricating operations may be performed as rapidly as possible and economic advantages thereby attained, a group of four pin insertion guns or mechanisms may, for example, be employed at a selected work station in an assembly line for simultaneous insertion, in each corner of each of a plurality, series or succession of panels being intermittently and sequentially moved along such assembly line, of an aperture mask support pin such as that mentioned. However, to expedite, to the extent possible, the movement of the panels through the selected pin insertion station in said assembly line, it is expedient that the support pins be supplied to said pin insertion guns or mechanisms relatively rapidly so that such guns or mechanisms stand reloaded in preparation for inserting a set of four pins in a succeeding panel or face plate moved into the pin insertion station as a preceding panel, in said succession thereof, is moved out of such station. It is, accordingly, an object of the present invention to provide a pin feeding mechanism for automatically and sequentially feeding each of a plurality of aperture mask support pins to a mechanism or gun for sequential insertion of each of the pins into the glass of face plates or viewing panels for color television picture tubes.

It is another object of the present invention to provide a pin feeding mechanism of the type mentioned and which operates relatively rapidly to sequentially feed the pins to a pin insertion gun or mechanism.

Other objects and characteristic features of the invention will become apparent as the description proceeds.

SUMMARY OF THE INVENTION

The invention is believed to be adequately summarized in the foregoing abstract of the disclosure and, therefore for the sake of brevity and to avoid repetition or redundancy to the extent possible, no further summary of the invention will be given nor is any believed necessary.

BRIEF DESCRIPTION OF THE DRAWINGS

In the drawings:

FIG. 1 is an isometric view of the mechanism or apparatus embodying the invention with part of such mechanism broken away to show internal structure thereof;

FIG. 2 is a schematic electrical wiring diagram of circuits for controlling the operation of the mechanism of the invention;

FIG. 5 is a side elevational view of another part of the mechanism or apparatus of FIG. 1;

FIG. 6 is a top plan view, on an enlarged scale, of the mechanism part of FIG. 5, such view being taken generally along line 6—6 of FIG. 5;

FIG. 7 is a cross-sectional view, on an enlarged scale, of the mechanism part of FIG. 5, such view being taken generally along line 7—7 of FIG. 5;

FIG. 8 is a front elevational view, on an enlarged scale, of one type of an aperture mask support pin which the mechanism or apparatus of the present invention is intended to conveniently handle;

FIG. 9 is a side elevational view of the pin of FIG. 8, such view being taken generally along line 9—9 of FIG. 8; and FIG. 10 is a top plan view of the pin of FIG. 8, such view being taken generally along line 10—10 of FIG. 8.

Similar reference characters refer to similar parts in each of the Figures of the drawings.

PREFERRED EMBODIMENT OF THE INVENTION

Figure 4:
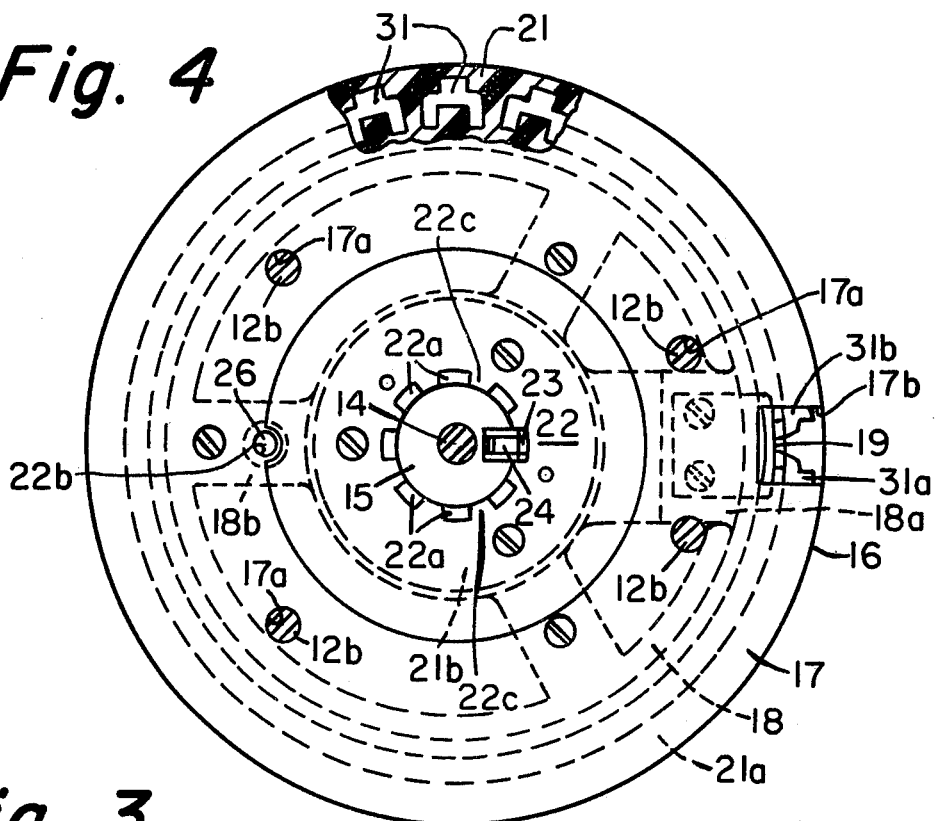
FIG. 4 comprises a bottom plan view of part of the mechanism or apparatus of FIG. 3, such view being taken generally along line 4—4 of FIG. 3 and a portion thereof being broken away to show internal structure thereof.

Referring to the drawings in detail, there is shown in FIG. 1 the pin feeding mechanism or apparatus 10 embodying the invention and including a support stand or magazine drive assembly 10a having a bottom or lower support plate 11 an an upper or top support plate 12 which are vertically spaced apart by a plurality of legs such as 13 to which such plates are secured. There is mounted and secured to the lower surface of upper plate 12 a gear motor GM including a gear box GB and which will be further discussed hereinafter. A rotary output shaft 14 of gear box GB extends upwardly through a suitable hole 12a in top or upper plate 12 and there is keyed thereto, for rotation therewith, a generally cylindrical hub or knob 15 having a hemispherical upper end and discussed further hereinafter. (See also FIGS. 3 and 4.)

Figure 3:
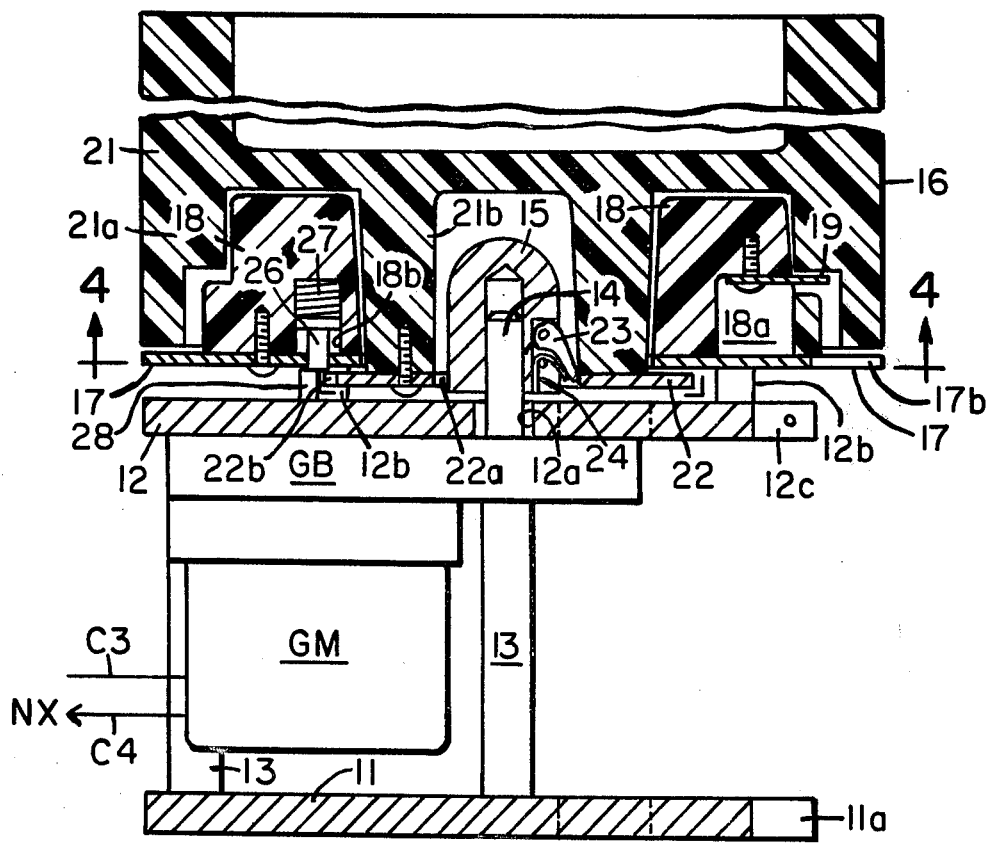
FIG. 3 is a side cross-sectional view of part of the mechanism or apparatus of FIG. 1 and embodying the invention.

Referring further to FIGS. 1, 3 and 4, a turret, or cylindrical pin magazine or canister 16 is shown and includes a stationary bottom disk 17 of a relatively large diameter and which embodies four holes such as 17a (FIG. 4) into which there snugly, but longitudinally movably, projects the upper ends of four locating shoulder pins such as 12b when the turrent or magazine is positioned on the shoulders of such pins as best illustrated in FIG. 3, such shoulder pins being secured in or on the upper surface of upper or top support plate 12. Bottom disk 17 is attached to the bottom surface of a spoked inner and annular member 18 of magazine or canister 16 and such member is, along with disk 17, stationary when the magazine or canister 16 is disposed on pins 12b with the upper ends of such pins extending into said positioning holes such as 17a in disk 17 as mentioned above. Disk 17 further embodies a small cutout 17b for a purpose hereinafter discussed, and spoked annular member 18 embodies a cavity 18a (right hand side of FIGS. 1 and 3) to the upper wall of which is fastened a small pin retention device or member in the form of a thin plate 19 which functions as also hereinafter discussed.

Turret, canister or pin magazine 16 further includes a main or outer generally cylindrical member 21 the lower end of which comprises outer and inner concentric annuluses 21a and 21b, respectively, with annulus 21a having an outer diameter substantially corresponding to that of disk 17 and a minimum inner diameter slightly larger than the outer diameter of spoked annular member 18. Annulus 21b has an outer diameter slightly smaller than the inner diameter of annular member 18 and, as best understood from FIG. 3, cylindrical member 21 can be rotated, as discussed below, without interference between such member and spoked annular member 18. This will be readily apparent from a brief glance at FIGS. 1 and 3 of the drawings.

A small diameter annular disk 22 is fastened to the lower surface of annulus 21b of outer member 21, such disk including about its circular inner periphery a series of similar and equally spaced apart cutouts, or recesses or notches, such as 22a, to provide a series of teeth such as 22c. A dog or lug 23 is pivotally supported adjacent its upper end in a recess in the aforesaid hub or knob 15 keyed to the upper end of output shaft 14 of gear box GM as best shown in FIG. 3. A curved leaf spring 24 (FIGS. 3 and 4) normally urges or biases the lower end of dog or lug 23 to project out of said recess in hub 15 so that such lug or dog can enter one of said cutouts, such as 22a, to engage one of said teeth, such as 23a, when disk 22 is in a rotational position such that such a cutout is relative precisely opposite or facing the dog or lug. By such arrangement, rotation of output shaft 14 of gear box GB will, in turn, impart corresponding rotation to hub or knob 15 and, when dog or lug 23 is engaged or engages with one of said teeth such as 22c of disk 22, similar rotation will be imparted to disk 22 and thence to cylindrical outer member 21 of canister or magazine 16. This will be readily apparent to those skilled in the art by a brief study of the drawings. It is believed expedient to point out at this time that the smaller diameter of the inner periphery of annular disk 22 substantially corresponds to the outer diameter of hub or knob 15 so that turrent or canister 16 can be positioned over said hub and on the upper ends of the aforesaid shoulder pins or posts such as 12b, as previously mentioned, with such hub or knob fitting snugly but slidably in said smaller diameter of the inner periphery of disk 22.

There is contained in a hole 18b (FIGS. 3 and 4) embodied in annular member 18 of turret 16, a spring-loaded headed pin 26 whose lower small diameter end extends downwardly through a suitable hole 22b embodied in large disk 17, such pin being urged downwardly to project its said lower end out of the bottom of hole 22b by a compressible coil spring 27 disposed in hole 18b above the head of pin 26. Disk 22 embodies in its outer edge or periphery a hemispherically shaped notch or recess 22b extending through such disk and into which said lower end of pin 26 extends when turret or magazine 16 is not positioned on the aforesaid shoulder pins such as 12b on upper plate 12 but disk 22 is in a rotational position such that the center of its recess 22b is aligned with the center of said pin 26. Pin 26 and recess 22b thus form a detent arrangement to prevent at such time, rotation of members 18 and 21 relative to one another. When, however, turret or magazine 16 is positioned on said shoulder pins, the upper end of a fixed pin 28, (FIG. 3) extending upwardly from the upper surface of upper plate 12, contacts the lower end of pin 26 towards the edge of such lower end (see FIG. 3) and pushes it upwardly out of notch or recess 22b in disk 22 and against the compressional force of spring 27 to permit relative rotation between members 18 and 21 at such time. The purpose of such detent or rotational locking arrangement will be pointed out hereinafter in an operational example of the invention.

Referring further to FIG. 4, there is shown, adjacent the upper border of such drawing figure and by a broken away portion of cylindrical member 21, the cross-sectional configuration of three of a plurality or series of vertical pin receiving and holding channels such as 31 which are embodied in cylindrical member 21 and extend thereabout adjacent the outer periphery thereof in a side by side vertically aligned relationship with each other. Each such channel extends vertically completely through member 21 and is intended to contain a plurality of channel-shaped pins, such as pin P shown in FIGS. 8, 9 and 10, vertically stacked on top of one another with the lower end of the lowermost pin of each stack thereof resting either on the upper surface of large disk 17, as shown adjacent the left hand side of FIG. 1, or with the edge of pin retention plate 19 contacting part of the sloping lower ends of the sides of the lowermost pin or pins of the stack or stacks of pins in the pin channel or channels positioned at the right hand side of mechanism 16 above the aforesaid cutout 17b in disk 17 as shown in FIGS. 1 and 4. It should be pointed out that the pin channels such as 31 are not shown in FIG. 1 because, in such drawing, the upper end of cylindrical member 21 is provided with a lid 21c (not shown in FIG. 3) which covers the upper ends of the pin channels as well as the annular configuration of the upper part of member 21.

It is believed expedient to point out at this time that the pin channels such as 31 in member 21 are shown as having a cross-sectional configuration substantially corresponding to the shape of an end of a channel-shaped pin such as pin P shown in FIGS. 8, 9 and 10, such end shape being illustrated in FIG. 10. However, it should also be pointed out that the mechanism 10 of the present invention can be used with pins of shapes other than that specifically shown in said drawing Figures For example, the mechanism 10 could be used with pins having a hole or slot in place of the pin protuberance PP shown in FIGS. 8, 9 and 10, or with channel-shaped pins having other than the geometric symmetry shown in such drawing figures. Furthermore, the mechanism of the present invention could be readily adapted to handle pins, other than channel-shaped pins, by changing the cross-sectional configuration of the channels such as 31 provided in member 21 of the mechanism, such changed configuration depending, of course, on the shape of the pins to be handled.

Referring now to FIGS. 5, 6 and 7, taken in conjunction with FIG. 1, there is shown a pin loading or feeding track assembly 36 comprising a pair of complementary side or track plates 37 and 38 which are spaced apart by three pairs of upper, middle and lower spacer members 39 and 40, 41 and 42, and 43 and 44, respectively, to the sides of which the side or track plates are fastened. The inside or facing walls of plates 37 and 38 embody relatively shallow channels 37a and 38a, respectively, which extend along the length of such wall of each respective plate for receipt of the sides of pins, such as P, shown in FIGS. 8, 9 and 10 and guidance of such pins through the track assembly. As best shown in FIG. 6, the walls defining channels 37a and 38a in plates 37 and 38 flare or slope outwardly towards the upper end of such channels to provide for ready receipt of the sides of the lower ends of pins such as P fed thereto from the lower ends of the channels such as 31 embodied in cylindrical member 21 of turret or magazine 16. Similarly, adjacent the upper ends of the lower spacer members 43 and 44, (FIG. 7) member 43 tapers somewhat in an upward direction while member 44 is provided with a channel 44a which slopes somewhat inwardly in a downward direction to readily receive and precisely position each pin, such as P, as it moves or slides downwardly through the lower part of loading or feeding track assembly 36 and out of the lower end thereof for delivery to the pin receiving end of a pin utilizing device designated UD in FIG. 1 and which may, for example, be a gun or mechanism for insertion of the pins into the glass of a television picture tube face plate or viewing panel as previously mentioned. A pair of adaptors or connecting blocks 46 and 47 are shown in FIG. 1 at the lower end of pin loading track assembly 36 for connecting the lower ends of the lower spacer members 43 and 44 to said pin utilizing device UD which does not, per se, form a part of the present invention and details of which are, therefore, not shown.

Referring further to FIGS. 1, 5 and 6, a pair of upper and lower legs 49a and 49b, respectively, of a right angle bracket 49 are secured to track or side plate 37 of assembly 36 adjacent the upper end thereof, such bracket including a main body or central portion 49c embodying a hole through which the neck portion of a proximity switch PS extends and is secured therein and thereto by a nut 51 screwed onto suitable threads provided on said neck portion and tightened against the adjacent surface of central portion 49c of bracket 49. The detection end or head portion PSE of switch PS extends into suitable cutouts 37b and 38b (FIGS. 1 and 5, respectively) provided in side or track plates 37 and 38, respectively, adjacent the upper ends thereof and below spacers 39 and 40. By such arrangement the face PSF of detection end PSE of switch PS is disposed near channels 37a and 38a in plates 37 and 38 so that the switch detects the passage of each pin that slides downwardly through such channels and passes near said face PSF of the switch. Each such detection of a passing pin actuates switch PS to actuate a pair of integral normally closed electrical circuit controlling contacts to their open condition to interrupt an electrical circuit as hereinafter described in conjunction with FIG. 2 and for a purpose hereinafter discussed. Proximity switches such as PS are well known and such switch may, for example, be a proximity switch such as is sold under catalog number 1286-1-A by Industrial Solid State Controls, Inc. whose address is 435 West Philadelphia Street, York, Pa. 17405.

As illustrated in FIG. 1, pin loading or feeding track assembly 36 is supported within forked cutout or yoke portions 11a and 12c of lower and upper plates 11 and 12, respectively, such track assembly 36 being pivotally suspended adjacent its upper end between the extending arms of forked or yoke portion 12c and the assembly, at approximately the center of the length thereof, extending between the extending arms of forked or yoke portion 11a which confine or limit movement of the assembly 36. It will be understood that pin feeding mechanism 10 (FIG. 1) is supported above the utilization device UD in any convenient manner such as, for example, by supporting lower plate 11 on a suitable shelf (not shown) or by suitable brackets secured to plate 11 (also not shown).

Before discussing the electrical circuitry of FIG. 2 in detail, it is believed expedient to point out that a source of direct current suitable for the energization of the control winding CW of a relay CR shown in FIG. 2 is provided, such source being omitted from the drawings for purposes of simplification thereof but its positive and negative terminals being designated B and N, respectively, in FIG. 2. Similarly, a source of alternating current suitable for the energization of the winding MW (FIG. 2) of gear motor GM is also provided, such source also being omitted from the drawings for purposes of simplification thereof but its opposite terminals being designated BX and NX, respectively, in FIG. 2. It is also pointed out that motors such as gear motor GM (FIGS. 1 and 3) are well known and such motor may, for example, be a Gear Motor Model HDM1 which may be obtained from E.C.M. Motor Company whose address is 1301 East Tower Road, Schaumburg, Ill. 60712. The output shaft of gear box GB of gear motor GM has, for example, a speed of 1 R.P.M. With further reference to FIG. 2, there is also shown normally open contacts a–b of a control switch CS, such contacts being momentarily actuated to close to, in effect, provide a signal when the utilization device designated UD in FIG. 1 is ready to receive an initial pin or another pin from the stacks of pins in the pin feeding mechanism of the invention. Contacts a–b of switch CS are shown enclosed in a broken line box in FIG. 2 to indicate that such contacts are not, per se, part of the apparatus of the present invention.

Referring now to FIG. 2 in more detail, control winding CW of relay CR has an energizing circuit which extends from terminal B of said direct current source through contacts a–b of aforesaid control switch CS, in the aforesaid momentarily closed condition of such contacts, and thence through said winding CW to terminal N of the direct current source. Winding CW has a holding circuit which extends from said terminal B over an electrical conductor C1 to contacts a–b of proximity switch PS and through such contacts, in their normally closed condition, to an electrical conductor C2 and thence through contacts a–b of relay CR and through the control winding CW of such relay to terminal N of the direct current source. (See also FIG. 5 for the connections of conductors C1 and C2 to proximity switch PS). Thus, when winding CW of relay CR becomes energized by the momentary closing of contacts a–b of control switch CS as mentioned above, relay CR closes its contacts a–b and said winding is maintained energized through such contacts and said contacts a–b of proximity switch PS until the latter contacts are momentarily actuated to their open condition by a pin sliding down through pin loading track assembly 36 and passing adjacent to face PSF of proximity switch PS and detected by such switch. Such momentary opening of contacts a–b of switch PS deenergizes winding CW of relay CR and the holding contacts a–b of such relay again open to further interrupt the holding circuit to said winding CW.

When winding CW of relay CR is energized as discussed above and closes contacts a–b in its holding circuit, contacts c–d of such relay also close to close an energizing circuit to the winding MW of gear motor GM, such energizing circuit extending from the aforesaid terminal BX of the aforesaid source of alternating current and through said contacts c–d of relay CR and thence over an electrical conductor C3 to one end of the winding MW of gear motor GM, and through such winding and over an electrical conductor C4 to the aforesaid terminal NX of the alternating current source. (See also FIG. 3 for the connections of conductors C3 and C4 to winding MW of motor GM). It is, therefore, readily apparent that motor GM is energized to impart rotation to the output shaft 14 of gear box GB of such motor whenever contacts a–b of control switch CS momentarily close, such energization continuing until proximity switch PS detects the passage of a pin and opens its contacts a–b in response to such detection. Turret or magazine 16 is therefore started to be rotated each time a signal is received from the utilization device UD indicating that it is ready to receive a pin (closing of contacts a–b of control switch CS) and such rotation continues until a pin is fed from the turret or magazine to pin loading track assembly 36 and slides down such track past the face of proximity switch PS and thence to device UD.

OPERATIONAL EXAMPLE OF THE INVENTION

Having described the structure of the pin feeding mechanism and its control circuits in detail, a brief operational example of the invention will now be given.

It will first be assumed that all but two adjacent ones of the channels such as 31 of a magazine, turret or canister such as 16 are completely filled with a succession of channel-pins, such as P shown in FIGS. 8, 9 and 10, in preparation for positioning of the magazine on shoulder pins 12b as illustrated in FIGS. 1 and 3. The two channels which are not completely filled are the two which are partially located above pin retention member or plate 19 (FIG. 4) when disk 22 is positioned as discusssed below. Such channels each have one less pin than the remainder of the channels. Thus, prior to filling of the channels such as 31, disk 22 of the magazine is positioned relative to disk 17 so that the lower end of detent pin 26 in hole 18b in annular member 18 (FIGS. 3 and 4) extends into detent or lock recess or cutout 22b in disk 22 as previously mentioned. This assures that disk 22 cannot be rotated in relation to disk 17 so that cutout 17b in such disk 17 and shown in FIGS. 1, 3 and 4, becomes aligned with the bottom end of one of the completely filled channels in magazine 16 but, rather, that such cutout is disposed so as to be partially adjacent the bottom end of approximately half of each of the above mentioned two of adjacent ones of the channels such as 31, as illustrated at the right hand side of FIG. 4. Such two channels are designated 31a and 31b. Thus, when magazine or canister 16 is inverted following filling of the channels and in preparation for positioning thereof as shown in FIGS. 1, 3 and 4, it is assured that relative rotation between disks 17 and 22 does not occur and, therefore, that none of the channel-pins in channels 31 will slide out of the bottom end of one or more of such channels since the bottom or lowermost channel-pin in each of the channels will be retained therein by disk 17 or retention member or plate 19 at such time.

It will now be assumed that a canister or turret such as 16 and prepared as described above is vertically disposed over knob or hub 15 and lowered down over such hub as shown in FIGS. 1, 3 and 4, and then rotated until the upper ends of the shoulder pins such as 12b enter their respectively associated holes such as 17a in disk 17 and such plate rests on the shoulders of such pins. At such time, the upper end of pin 28, on the upper surface of plate 12, contacts the lower end of detent pin 26 and pushes such pin upwardly out of recess 22b in disk 22 against the force of coil spring 27. This releases or unlocks disk 22 so that such disk and member 21 of magazine 16 may now be rotated relative to member 18 and disk 22. The hemispherical top of knob or hub 15 aids in positioning of the magazine at such time and annulus 21b of member 21 of the magazine also enters the center hole in annular member 18 of the magazine at such time. If, during such positioning, hub 15 is suitably positioned, dog or lug 23 in such hub enters one of the cutouts such as 22a in the inner periphery of disk 22 as shown in FIGS. 1, 3 and 4. However, if said dog or lug is not so positioned, it is moved by disk 22 into hub 15 against the compressional force of leaf spring 24 until hub 15 is later rotated so that the dog or lug is in position to be moved into one of the cutouts by the compressional force of spring 24.

Following the above preparations, utilization device UD is activated and, subsequently, contacts a–b of control switch CS (FIG. 2) are closed to energize relay CR as previously discussed. Relay CR closes its contacts c–d to energize gear motor GM to drive or rotate output shaft 14 of gear box GB of motor GM and, in turn, hub or knob 15. If dog or lug 23 is in one of the cutouts such as 22a of disk 22 at such time, the rotation of hub 15 imparts rotation to disk 22 which rotates member 21 of magazine or canister 16. If said lug or dog 23 is not in one of said cutouts when hub 15 begins to rotate, such dog or lug will be forced by leaf spring 24 into the cutout closest to the dog or lug for the direction of rotation of hub 15 and shortly following the start of rotation of such hub. The above described rotation of disk 22 and magazine 15 will then begin.

Assuming that member 15 is rotated in a clockwise direction when viewing FIG. 4, as such rotation progresses, the aforesaid channel 31a in member 21 will first move from over pin retention member or plate 19 and the lowermost channel-pin in such channel will drop and its lower end will contact disk 17. Next, channel 31b will move from over retention plate 19 and the lowermost pin in that channel will drop and its lower end will contact disk 17. As the next channel such as 31, that is, as the channel next following channel 31b moves over retention plate 19 and cutout 17b in disk 17, the lower end of the lowermost channel-pin in such next following channel is moved off of the upper surface of disk 17 and over and into alignment with cutout 17b in such disk to drop into the upper or receiving end of pin loading track assembly 36 and will slide downwardly therethrough to utilization device UD. At the same time the lower ends of the sides of the next channel-pin above the lowermost pin in said next following channel will be contacted by pin retention plate 19 which will then retain such next pin in its associated channel. This is illustrated in FIG. 1 which shows said lowermost channel-pin dropping into said upper or receiving end of assembly 36 and the pin next above such lowermost pin being retained in its associated channel by retention plate 19.

As the above-mentioned lowermost channel-pin passes the face PSF of proximity switch PS, contacts a–b of such switch (FIG. 2) are actuated to their open condition to, in turn, open the holding circuit for relay CR to deenergize such relay which then immediately opens its contacts c–d to deenergize winding MW of gear motor GM as previously discussed. Gear motor GM is provided with a brake which stops the rotation of the armature of such motor substantially immediately upon the deenergization of the motor winding and, therefore, at this time, the rotation of output shaft 14 is also stopped almost immediately. The apparatus remains in this condition until a signal for another channel-pin is received from utilization device UD and another period of rotation of the apparatus is thus initiated, in the manner identical to that discussed above, to move the lowermost channel-pin in the next succeeding channel over cutout 17b in disk 17 for feeding thereof to the utilization device UD while the pin next above such lowermost pin is retained in such next succeeding channel by retention plate 19. As each feeding operation occurs, the preceding channel-pin, having the lower ends of its sides contacting the top surface of retention plate 19, is moved so that said lower ends no longer contact said top surface and such pin drops and its lower end comes into contact with the top surface of disk 17 in preparation for feeding such pin to the utilization device when the channel such as 31 containing that pin is next positioned above cutout 17b in disk 17, such next positioning occurring at the end of a following full revolution of turret or magazine 16. Thus, each of the lowermost pins in each of the succession of channels such as 31, provided about turret or magazine 16, are successively fed to the utilization device UD upon successive energizations of gear motor GM and, for example, if there are, in a filled magazine such as 16, 30 of said channels such as 31 and a stack of 10 pins are assumed to be in each said channel (except, as mentioned above, in channels 31a and 31b which would then hold only nine pins each) it would require 280 energizations of gear motor GM to deplete such a filled magazine.

When a canister, magazine or turret such as 16 is depleted of channel-pins, it may be readily lifted and rapidly removed from the remainder of the pin feeding mechanism and replaced by another filled canister, magazine or turret which is positioned on support plate 12 in the manner described above. Thus as long as a supply of filled canisters or magazines is maintained, a pin feeding mechanism, such as 16 disclosed, may be kept in operation indefinitely, that is, until repairs thereto or maintenance thereof is required. Although believed obvious, it should be pointed out that the number of adjacent pin channels provided about the periphery of a magazine or turret such as 16 can vary in accordance with various diameters selected for such magazines or turrets and the size of the pins being handled. Similarly, the number of pins, in a stack thereof provided in a channel such as 31, can vary in accordance with the height selected for the magazines, canisters or turrets such as 16 and the length of each of the pins.

Although there is herein shown and described only a single embodiment of the invention disclosed, it is to be understood that such is not to be considered in any way limiting but that various changes and modifications may be made therein within the purview of the appended claims without departing from the spirit and scope thereof.

What is claimed is:

1. A mechanism for sequentially feeding to a utilization device each of a plurality of relatively elongate pins each having a U-shaped cross-sectional configuration taken on a plane normal to the length thereof and sides whose ends slope, at one end thereof, in directions parallel with each other, such mechanism comprising, in combination;

A. a cylindrical pin magazine including;
  I. an outer main member embodying a plurality of elongate pin receiving channels aligned side-by-side with each other parallel with the length of said magazine and extending therethrough adjacent the outer periphery thereof, each of said channels having a cross-sectional configuration corresponding to that of one of said pins and of slightly larger size, such member having secured to the lower end thereof a first annular disk embodying a plurality of teeth spaced apart about the inner periphery thereof;
  II. an inner annular member surrounded by said outer member adjacent the lower end thereof, such inner member having secured to the lower end thereof, above and slightly spaced from said first disk, a second annular disk extending under the lower ends of said channels in relatively close proximity thereto, such disk embodying in the outer periphery thereof a cut-out of a larger size than said cross-section of one of said channels in said magazine; and
  III. a pin retention plate secured to said inner annular member adjacent the outer periphery thereof, such member extending outwardly partially over said cut-out in said second disk at a height slightly greater than the length of each of said pins;

B. a magazine support and drive assembly, such assembly including;
  I. a support plate having means on the upper surface thereof for removably and precisely positioning said second annular disk thereon with said first annular disk slightly spaced from said upper surface of such support plate;
  II. electric motor means including an output shaft extending upwardly through a suitable hole provided in said support plate; and
  III. a generally cylindrical hub keyed to said output shaft for driven rotation therewith, such hub extending upwardly through the inner periphery of said first disk in a relatively snug but slidable relationship therewith and including a lug in a recess in the hub and normally spring biased out of such recess for engagement with one of said teeth in said inner periphery of the first disk for driven rotation thereof and, thereby, of said outer main member;

C. a pin feeding track assembly having an upper end attached to said support plate below said cutout in said second annular disk and a lower end attached to said utilization device, such assembly embodying pin guide channels extending vertically through the length thereof and providing a pin guide track for receiving at the upper end thereof pins released from said magazine and delivering at the lower end thereof such pins to said utilization device;
D. pin detection means disposed adjacent said pin guide track for detection of the passage of a pin moving through such track and actuating a pair of electrical circuit controlling contacts in response to such a detection; and
E. electrical circuit means, including said electrical circuit controlling contacts, for energizing said motor means to impart rotation to said main member of said magazine when a control signal is received from said utilization device and to interrupt such energization when said electrical circuit controlling contacts are actuated in response to said detection of a pin.

2. A mechanism in accordance with claim 1 and in which said pin detection means is a proximity switch.

3. A mechanism in accordance with claim 1 and in which said pins are pins for insertion into a surface of a face plate for a color television picture tube for support of an aperture mask adjacent to such surface and said utilization device is a pin insertion gun.

4. A mechanism in accordance with claim 1 and in which said magazine is readily removable from said support and drive assembly for replacement by another similar magazine.

5. A mechanism in accordance with claim 2 and in which said pins are pins for insertion into a surface of a face plate for a color television picture tube for support of an aperture mask adjacent to such surface and said utilization device is a pin insertion gun.

6. A mechanism in accordance with claim 2 and in which said magazine is readily removable from said support and drive assembly for replacement by another similar magazine.

7. A mechanism in accordance with claim 3 and in which said magazine is readily removable from said support and drive assembly for replacement by another similar magazine.

* * * * *